United States Patent
Subramaniyam

(10) Patent No.: US 9,637,691 B2
(45) Date of Patent: May 2, 2017

(54) ADDITIVE COMPOSITION AND METHOD FOR SCAVENGING HYDROGEN SULFIDE IN HYDROCARBON STREAMS

(75) Inventor: Mahesh Subramaniyam, Mumbai (IN)

(73) Assignee: Dorf Ketal Chemicals (India) Private Limtied, Mumbai (IN)

( * ) Notice: Subject to any disclaimer, the term of this patent is extended or adjusted under 35 U.S.C. 154(b) by 176 days.

(21) Appl. No.: 13/988,748

(22) PCT Filed: Nov. 18, 2011

(86) PCT No.: PCT/IN2011/000803
§ 371 (c)(1),
(2), (4) Date: May 21, 2013

(87) PCT Pub. No.: WO2012/070065
PCT Pub. Date: May 31, 2012

(65) Prior Publication Data
US 2013/0240409 A1    Sep. 19, 2013

(30) Foreign Application Priority Data
Nov. 22, 2010   (IN) .......................... 3170/MUM/2010

(51) Int. Cl.
| | | |
|---|---|---|
| *C10G 29/20* | (2006.01) | |
| *C10G 29/22* | (2006.01) | |
| *C10G 29/24* | (2006.01) | |
| *B01D 53/52* | (2006.01) | |
| *B01D 53/14* | (2006.01) | |
| *B01D 53/77* | (2006.01) | |
| *C10L 3/10* | (2006.01) | |
| *C10L 1/185* | (2006.01) | |
| *C10L 1/198* | (2006.01) | |

(52) U.S. Cl.
CPC ......... *C10G 29/20* (2013.01); *B01D 53/1493* (2013.01); *B01D 53/52* (2013.01); *B01D 53/77* (2013.01); *C10G 29/22* (2013.01); *C10G 29/24* (2013.01); *C10L 3/103* (2013.01); *B01D 2252/20* (2013.01); *B01D 2252/2028* (2013.01); *B01D 2256/24* (2013.01); *C10G 2300/1033* (2013.01); *C10G 2300/207* (2013.01); *C10G 2300/80* (2013.01); *C10L 1/1857* (2013.01); *C10L 1/1985* (2013.01)

(58) Field of Classification Search
CPC .......... C10G 29/20; C10G 29/22; C10G 29/24
See application file for complete search history.

(56) References Cited

U.S. PATENT DOCUMENTS

| | | | |
|---|---|---|---|
| 1,991,765 A | 2/1935 | Marks | |
| 3,489,719 A | 1/1970 | Savage et al. | |
| 4,455,416 A | 6/1984 | Floyd et al. | |
| 4,680,127 A * | 7/1987 | Edmondson | 210/749 |
| 5,085,842 A | 2/1992 | Porz et al. | |
| 6,666,975 B1 | 12/2003 | Chen et al. | |
| 7,078,005 B2 | 7/2006 | Smith et al. | |
| 2003/0199406 A1 * | 10/2003 | Anzures et al. | 510/175 |
| 2009/0314720 A1 * | 12/2009 | Smith et al. | 210/702 |

FOREIGN PATENT DOCUMENTS

| | | |
|---|---|---|
| EP | 0438812 A1 | 7/1991 |
| JP | 2001159077 A | 6/2001 |
| JP | 2007289964 A | 11/2007 |
| WO | 2010128523 A2 | 11/2010 |
| WO | 2012070065 A1 | 5/2012 |

OTHER PUBLICATIONS

Foreign communication from the priority application—International Search Report, PCT/IN2011/000803 dated Apr. 23, 2012, 4 pages.
Foreign communication from the priority application—International Preliminary Report on Patentability, PCT/IN2011/000803 dated Oct. 24, 2012, 16 pages.

* cited by examiner

*Primary Examiner* — Renee Robinson
(74) *Attorney, Agent, or Firm* — Conley Rose, P.C.; Rodney B. Carroll

(57) ABSTRACT

The present invention relates to hydrogen sulfide scavenging additive composition comprising glyoxal and a polymer compound which is polymer made from propylene oxide, which is capable of scavenging or removing hydrogen sulfide in hydrocarbons or hydrocarbon streams without causing any problem. The present invention is also relates to a method of scavenging hydrogen sulfide employing present scavenging additive composition comprising glyoxal and a polymer compound which is polymer made from propylene oxide. The present invention is also relates to a method of using hydrogen sulfide scavenging additive composition comprising glyoxal and a polymer compound which is polymer made from propylene oxide.

24 Claims, No Drawings

ADDITIVE COMPOSITION AND METHOD FOR SCAVENGING HYDROGEN SULFIDE IN HYDROCARBON STREAMS

CROSS-REFERENCE TO RELATED APPLICATIONS

This application is a filing under 35 U.S.C. 371 of International Application No. PCT/IN2011/000803 filed Nov. 18, 2011, entitled "Additive Composition and Method for Scavenging Hydrogen Sulfide in Hydrocarbon Streams," which claims priority to Indian Patent Application No. 3170/MUM/2010 filed Nov. 22, 2010, which applications are incorporated by reference herein in their entirety.

FIELD OF THE INVENTION

The present invention generally relates to an improved additive composition for scavenging hydrogen sulfide in hydrocarbons or hydrocarbon streams by removing or reducing levels of hydrogen sulphide therein.

Particularly, it relates to additive composition and method for scavenging hydrogen sulphide from hydrocarbon streams including crude oil, fuel oil, sour gas, and asphalts and refined products contained in storage tanks, vessels, pipelines.

More particularly, it relates to additive composition and method for scavenging hydrogen sulphide from hydrocarbon streams including crude oil, fuel oil, sour gas, and asphalts and refined products contained in storage tanks, vessels, pipelines, wherein the additive is non-nitrogen and non-halide scavenging additive.

BACKGROUND OF THE INVENTION

The toxicity of hydrogen sulfide in hydrocarbons or hydrocarbon streams is well known in the industry and considerable expense and efforts are expended annually to reduce its content to a safe level. Many regulations require pipeline gas to contain no more than 4 ppm hydrogen sulfide.

In large production facilities, it is generally more economical to install a regenerative system for treating hydrogen sulphide streams. These systems typically employ a compound used in an absorption tower to contact the produced fluids and selectively absorb the hydrogen sulfide and possibly other toxic materials such as carbon dioxide and mercaptans. The absorption compound is then regenerated and reused in the system. Typical hydrogen sulfide absorption materials include alkanolamines, hindered amines, and the like, i.e. nitrogen containing compounds. However, such approach is not economically feasible for development stage of a field or in small producing fields.

For development stage of a field or in small producing fields where regenerative systems are not economical, it is necessary to treat the sour hydrocarbon production with non-regenerative scavengers.

The U.S. Pat. No. 1,991,765 [US'765] disclosed use of reaction of aldehyde and hydrosulfide in aqueous solution having pH between 2 to 12. Thereafter, use of aldehydes to remove or scavenge hydrogen sulfide was reported in many patents. Mainly aldehydes including formaldehyde, or glyoxal, or formaldehyde in combination with other aldehydes, or glyoxal in combination with other aldehydes have been used as hydrogen sulfide scavengers/removing agents. In the formaldehyde type reaction, the reaction produces a chemical complex known as formthionals (e.g., trithiane).

The non-regenerative scavengers for small plant hydrogen sulfide removal fall into four groups: aldehyde based, metallic oxide based, caustic based, and other processes. In the removal of hydrogen sulfide by non-regenerative scavengers, the scavenger reacts with the hydrogen sulfide to form a nontoxic compound or a compound which can be removed from the hydrocarbon.

The U.S. Pat. No. 4,680,127 [US'127] reported use of glyoxal or glyoxal in combination with other aldehydes in small amounts, which resulted in scavenging of hydrogen sulfide by forming water soluble products. However, the main problem of this method is that the resulted water soluble products were stable only in alkaline pH of about 9, and decomposed in acidic pH of about 4.5 to 5.5.

The solution to above problem of US'127 was provided by U.S. Pat. No. 5,085,842 [US'842] which reported use of glyoxal, but in very high amounts at least of 15% by weight, preferably of 25 to 45% by weight to form water insoluble products. The main problem of this solution is that glyoxal has to be employed in very high amounts, which also makes the process highly uneconomical. Additional problem of this method is that it results in water insoluble products, which are prone to get deposited in the vessels and cause fouling meaning thereby additional anti-fouling additive will be required. Accordingly, as per inventor of present invention, this method is neither economical nor industrially feasible and convenient.

The U.S. Pat. No. 6,666,975 [US'975] also reported use of glyoxal, but with aim to provide a method to reduce emission of hydrogen sulfide odor wherein products formed are water soluble and non-volatile. The US'975 does not aim to overcome problem of fouling in treatment of hydrocarbons which may be caused due to water insoluble products formed by use of glyoxal in higher amounts as reported in US'842, but only aims to avoid handling problems of glyoxal without any disclosure or teaching that how one can achieve hydrogen sulfide scavenging without facing a) problem of fouling which may be caused by employing method of US'842 and b) problem of decomposition of products which may be water soluble products but decompose in acidic pH which may be caused by employing method of US'127. Even the US'975 does not discuss US'842 and US'127.

NEED OF THE INVENTION

Accordingly, there is still a need of an additive composition and method which is suitable for scavenging sulfur containing compounds including hydrogen sulfide, particularly hydrogen sulfide in the hydrocarbons or hydrocarbon streams, and overcomes one or more of above-described problems of the prior art, and which at least comprises substantially reduced amount of glyoxal, and is also required in substantially reduced amount to scavenge the sulfur containing compounds, and also acts at a faster rate to scavenge the sulfur containing compounds, and neither comprises 'nitrogen containing compound' nor 'an halide compound'.

PROBLEM TO BE SOLVED BY THE INVENTION

Therefore, the present invention aims at providing a solution to one or more of above-described existing industrial problems by providing the additive composition and method which is capable of scavenging sulfur containing compounds including hydrogen sulfide, particularly hydrogen sulfide in the hydrocarbons or hydrocarbon streams without causing any problem, wherein the additive composition comprises substantially reduced amount of glyoxal, and is also required in substantially reduced amount to scavenge the sulfur containing compounds, and also acts at a faster rate to scavenge the sulfur containing compounds, and neither comprises 'nitrogen containing compound' nor 'an halide compound'.

OBJECTS OF THE INVENTION

Accordingly, the main object of present invention is to provide an additive composition for scavenging hydrogen sulfide in hydrocarbons or hydrocarbon streams wherein said additive composition is capable of scavenging or removing hydrogen sulfide from the hydrocarbons or hydrocarbon stream, and wherein the additive composition comprises substantially reduced amount of glyoxal, and the composition is also required in substantially reduced amount to scavenge the sulfur containing compounds, and the composition also acts at a faster rate to scavenge the sulfur containing compounds, and the composition neither comprises 'nitrogen containing compound' nor 'an halide compound'.

This is also an object of present invention to provide a method of using an additive composition for scavenging hydrogen sulfide in hydrocarbons or hydrocarbon streams wherein the hydrocarbons or hydrocarbon stream is treated with an additive composition which scavenges or removes hydrogen sulfide from the hydrocarbons or hydrocarbon stream, and wherein the additive composition comprises substantially reduced amount of glyoxal, and the composition is also required in substantially reduced amount to scavenge the sulfur containing compounds, and the composition also acts at a faster rate to scavenge the sulfur containing compounds, and the composition neither comprises 'nitrogen containing compound' nor 'an halide compound'.

This is also an object of present invention to provide a method for scavenging hydrogen sulfide in hydrocarbons or hydrocarbon streams by employing additive composition of present invention which comprises substantially reduced amount of glyoxal, and is also used in substantially reduced amount to scavenge the sulfur containing compounds, and also acts at a faster rate to scavenge the sulfur containing compounds, and neither comprises 'nitrogen containing compound' nor 'an halide compound'.

This is also an object of present invention to provide an additive composition and method its use for scavenging hydrogen sulfide in hydrocarbons or hydrocarbon streams wherein additive composition comprises substantially reduced amounts of glyoxal, and thereby, makes the composition and its use economical, industrially feasible and convenient.

This is also an object of present invention to provide additive composition and method for scavenging sulfur containing compounds including hydrogen sulfide in the hydrocarbons or hydrocarbon streams including crude oil, fuel oils, sour gas, and asphalts and refined products contained in storage tanks, vessels, pipelines.

Other objects and advantages of present invention will become more apparent from the following description when read in conjunction with examples, which are not intended to limit scope of present invention.

DESCRIPTION AND PREFERRED
EMBODIMENTS OF THE INVENTION

With aim to overcome above-described problems of prior art and to achieve above-described objects of the invention, the inventor has found that when an hydrocarbon containing sulfur compounds including hydrogen sulfide is treated with additive composition comprising glyoxal and a polymer compound selected from group comprising polymer made from ethylene oxide, polymer made from propylene oxide, polymer made from butylene oxide, copolymer of polymers made from propylene oxide and ethylene oxide, and copolymer of polymers made from propylene oxide and butylene oxide, the hydrogen sulfide is scavenged or removed. However, the inventor has found that the capability of glyoxal to scavenge hydrogen sulfide, surprisingly and unexpectedly, gets substantially enhanced to a greater extent when polymer compound is polymer made from propylene oxide, and not when polymer compound is polymer made from ethylene oxide, copolymer of polymers made from propylene oxide and ethylene oxide. which confirms that the polymer made from propylene oxide has surprising and unexpected synergistic effect to substantially enhance scavenging capability of glyoxal, which otherwise, as found by the inventor, does has scavenging capability, but when used in comparatively very higher amounts.

Accordingly, in main embodiment, the present invention, relates to additive composition for scavenging hydrogen sulfide in hydrocarbons or hydrocarbon streams, wherein said additive composition comprises glyoxal and polymer compound which is polymer made from propylene oxide.

In accordance with present invention, the additive composition comprising glyoxal and polymer made from propylene oxide has been found to be capable of scavenging or removing hydrogen sulfide from the hydrocarbons or hydrocarbon stream.

Accordingly, in another embodiment, the present invention, also relates to method of using additive composition for scavenging hydrogen sulfide in hydrocarbons or hydrocarbon streams, wherein the hydrocarbons or hydrocarbon stream is treated with an additive composition which scavenges or removes hydrogen sulfide from the hydrocarbons or hydrocarbon stream, and wherein said additive composition comprises glyoxal and polymer compound which is polymer made from propylene oxide.

In accordance with present invention, when additive composition comprising glyoxal and polymer made from propylene oxide is employed in hydrocarbons or hydrocarbon streams comprising sulfur containing compounds, the additive composition of present invention scavenges or removes sulfur containing compounds including hydrogen sulfide from the hydrocarbons or hydrocarbon stream.

Accordingly, in another embodiment, the present invention, also relates to a method for scavenging sulfur containing compounds including hydrogen sulfide from the hydrocarbons or hydrocarbon stream, wherein the hydrocarbons or hydrocarbon stream is treated with an additive composition which scavenges or removes sulfur containing compounds including hydrogen sulfide from the hydrocarbons or hydrocarbon stream, and wherein said additive composition comprises glyoxal and polymer compound which is polymer made from propylene oxide.

In accordance with present invention, the ratio of glyoxal and polymer compound (the components of hydrogen sulfide scavenging composition of present invention) are taken in an amount varying between 99 parts of glyoxal to 0.1 part of polymer compound and 0.1 part of glyoxal to 99 parts of polymer compound in the present additive composition, its method of use and in a method for scavenging sulfur containing compounds in hydrocarbons or hydrocarbon streams.

The inventor has found that amount of polymer compound varying up to about 25% by weight, preferably up to about 10% by weight, or up to about 5% by weight of the composition in scavenging composition of present invention is sufficient to substantially enhance scavenging capability of glyoxal, and thereby, to substantially reduce required amount of glyoxal in the composition.

Therefore, in accordance with one of the preferred embodiments of the present, the scavenging composition comprises polymer compound varying up to about 25% by weight, preferably up to about 10% by weight, or up to about 5% by weight of the composition of the present invention, its method of use and in a method for scavenging sulfur containing compounds in hydrocarbons or hydrocarbon streams.

The inventor has further found that (overall) amount of present additive composition comprising glyoxal and polymer compound required to scavenge or remove sulfur containing compounds from the hydrocarbons or hydrocarbon streams is substantially reduced when compared with additive consisting only of glyoxal, which confirms that required (overall) amount of glyoxal to scavenge or remove sulfur containing compounds from the hydrocarbons or hydrocarbon streams is substantially reduced.

Accordingly, in accordance with one of the preferred embodiments of present invention, in carrying out the method of scavenging or method of use of present additive composition for scavenging the hydrogen sulfide in hydrocarbon or hydrocarbon stream, the scavenging additive composition is added to the hydrocarbon or gas stream or hydrocarbon stream in a concentration sufficient to substantially scavenge hydrogen sulfide therein. In accordance with one of the preferred embodiments of the present invention, the scavenging additive composition is added in an amount varying from about 1 to about 4000 ppm by weight of hydrocarbon or hydrocarbon stream in method of use of present composition and in a method for scavenging sulfur containing compounds in hydrocarbons or hydrocarbon streams by employing present composition.

The inventor has further found that when additive composition of present invention is employed, it scavenges the sulfur containing compounds in hydrocarbons or hydrocarbon streams much faster than additive consisting of glyoxal. It may be noted that when same amount of additive consisting of glyoxal and present additive composition comprising glyoxal and polymer compound were used to scavenge sulfur containing compounds in hydrocarbon for two hours, the percent efficiency to scavenge the sulfur containing compounds of present additive composition was found to be 60% as against only 16.6% for the additive consisting of glyoxal, which confirms that the composition of present invention also acts at a faster rate to scavenge the sulfur containing compounds in hydrocarbons or hydrocarbon streams than additive consisting of glyoxal.

Accordingly, in accordance with one of the preferred embodiments of present invention, there is provided additive composition and a method its use for scavenging sulfur containing compounds including hydrogen sulfide from the hydrocarbons or hydrocarbon stream, wherein the hydrocarbons or hydrocarbon stream is treated with an additive composition which scavenges or removes sulfur containing compounds including hydrogen sulfide from the hydrocarbons or hydrocarbon stream, and wherein said additive composition comprises glyoxal and polymer compound which is polymer made from propylene oxide, and wherein the additive composition acts at a faster rate to scavenge the sulfur containing compounds in hydrocarbons or hydrocarbon streams, and thereby makes the process economical, industrially feasible and convenient.

From the foregoing description and following supported examples, a reference to which is drawn here, it may be noted that use of up to about 25% by weight, preferably up to about 10% by weight, or up to about 5% by weight of the polymer compound in additive composition of present invention not only reduces requirement of (overall) amount of glyoxal in the additive composition, but also reduces requirement of amount of present scavenging additive composition [Re Example 1, Example 2, and corresponding Table I], and also scavenges sulfur containing compounds in hydrocarbons at a faster rate [Re Example 11, Example 14, and corresponding Table III].

Accordingly, it is understood from the foregoing that presently provided additive composition and its method of use and the method of scavenging the sulfur containing compounds in hydrocarbons or hydrocarbon streams overcomes disadvantages and drawbacks of the prior art by providing additive composition comprising substantially reduced amount of glyoxal, and at the same time being required in substantially reduced amount to scavenge the sulfur containing compounds, and also being capable of acting at a faster rate to scavenge the sulfur containing compounds.

It may also be noted that the additive composition of present invention neither comprises 'nitrogen containing compound' nor 'an halide compound', and in method of its use and in a method for scavenging sulfur containing compounds in hydrocarbons or hydrocarbon streams by employing present composition.

As described above, the main problem of using glyoxal in higher amounts is that it makes the process highly uneconomical, industrially infeasible and inconvenient. Additionally, use of higher amounts of glyoxal results in water insoluble products, which are prone to get deposited in the vessels, and thereby, cause fouling. Therefore, as the required amount of glyoxal is substantially reduced in additive composition of present invention, the problems associated with higher amount of glyoxal get overcome.

In accordance with one of the preferred embodiments of present invention, said polymer made from propylene oxide is polypropylene glycol-400 [PPG400]. In accordance with present invention said polypropylene glycol-400 has 100% active dosage and 400 dalton molecular weight.

In accordance with one of the embodiments of the present invention, the polypropylene glycol (PPG) having molecular weight varying from about 200 to about 800 daltons, preferably from about 200 to about 600 may be employed in the additive composition of present invention or in method of its use or in a method for scavenging sulfur containing compounds in hydrocarbons or hydrocarbon streams by employing present composition.

In accordance with one of the preferred embodiments of present invention, the scavenging additive composition of present invention may be injected in the flow lines in case of development stage of a field or in small producing fields, or the gas containing hydrogen sulfide may be passed through an absorption tower wherein scavenging composition of present invention has been injected in case of large production facilities.

The scavenging additive composition and method of present invention may be used in scavenging hydrogen sulphide from hydrocarbons or hydrocarbon streams including crude oil, fuel oil, sour gas, and asphalts and refined products contained in storage tanks, vessels, pipelines.

In accordance with one of the embodiments of the present invention, the method of using the additive composition of present invention is carried out as described in the following examples a reference to which is drawn herein for the purpose of describing and claiming the method of using additive composition of the present invention for scavenging hydrogen sulfide in hydrocarbons or hydrocarbon streams.

In accordance with present invention, it has been found that composition comprising glyoxal and copolymer of polymers made from propylene oxide and ethylene oxide do have hydrogen sulfide scavenging capability, but substantially very low efficiency when compared with composition comprising glyoxal and polymer made from propylene oxide.

In accordance with present invention, the scavenging additive composition comprising glyoxal and polymer made from propylene oxide has been found to be capable of scavenging hydrogen sulfide in hydrocarbons or hydrocarbon streams without causing any problem. Further, in the composition of present invention, the glyoxal is used in comparatively very low amounts, and hence, the present composition and process employing present composition becomes highly economical, industrially feasible and convenient.

In accordance with one of the embodiments of the present invention, the additive composition may be used to scavenge the sulfur containing compounds including hydrogen sulfide from the crude oil when it is passing through the desalter or is being treated with wash water in the crude oil processing system.

The present invention is now described with the help of following examples, which are not intended to limit scope of present invention, but have been incorporated to illustrate advantages of present invention and best mode to perform it. The following examples also demonstrate surprising effectiveness of scavenging additive composition of present invention.

In the following examples polypropylene glycol-400 [PPG400] (a polymer made from propylene oxide) having 100% active dosage and 400 dalton molecular weight was used as one of the polymer compounds of present invention. However, it may be noted that a person skilled in the art may use PPG having molecular weight varying from about 200 to about 800 daltons.

In following examples:
'glyoxal 30%' means 70% is water or a diluent,
the '33.3% Active' means 31.6% activity of glyoxal and 1.7% of PPG400 [example 2],
PEG 200 and PEG 400 are polymer made from ethylene oxide and are known as polyethylene glycol having molecular weight 200 dalton and 400 dalton respectively,
PPG 4000 is polypropylene glycol having molecular weight 4000 dalton and is a polymer made from propylene oxide,
Pluronic L61 is co-polymer made from propylene oxide and ethylene oxide having molecular weight of 2000 dalton as available from BASF,
Pluronic L81 is co-polymer made from propylene oxide and ethylene oxide having molecular weight of 2750 dalton as available from BASF, and
LAE is lauryl alcohol ethoxylated having 9 moles of ethylene oxide.

EXAMPLES

Example 1

The $H_2S$ was purged in 100 ml of kerosene till concentration of $H_2S$ vapor reaches to 1500% Vol in blank sample [Blank-I]. To the resulted solution 4300 ppm of glyoxal 30% resulting in effective dosage of 1290 ppm of glyoxal was added, and the solution was shaken well and kept at the temperature of 60° C. The concentration of $H_2S$ was measured by Gas Detector Tube after 20 hrs in vapour phase which was found to be 25% vol confirming 98.33% efficiency of glyoxal to scavenge hydrogen sulfide.

Example 2

To the blank sample of Example 1 [Blank-I], the 2500 ppm of additive composition of present invention comprising 95% of glyoxal and 5% of PPG400 having effective dosage of 790 ppm of glyoxal and 42 ppm of PPG400 was added and treated in same manner as in Example 1. The concentration of $H_2S$ was measured as in Example 1 after 20 hrs in vapour phase which was found to be 25% Vol confirming 98.33% efficiency of additive composition to scavenge hydrogen sulfide.

The results of Examples 1 and 2 are presented in Table-I.

TABLE I

| | Additive/ Additive Composition | Active (%) | Dosage (ppm) | Active Dosage (ppm) | $H_2S$ Vapor (% Vol) | Efficiency (%) |
|---|---|---|---|---|---|---|
| Blank-I | Blank Sample | — | — | — | 1500 | — |
| Ex. 1 | Glyoxal 30% | 30 | 4300 | 1290 | 25 | 98.33 |
| Ex. 2 | Glyoxal/ PPG400 (95/05) | 33.3 | 2500 | 832 | 25 | 98.33 |

It may be noted that in blank sample used for Example 1 and Example 2, the concentration of $H_2S$ vapor was increased to 1500% Vol. To scavenge hydrogen sulfide in the blank sample till concentration of $H_2S$ in vapour phase reduces to 25% Vol, the inventor had to continue to add the glyoxal [Example 1] and the additive composition of glyoxal and PPG400 [Example 2] to achieve about 98% efficiency.

It was found that in Example 1 only after addition of 4300 ppm of glyoxal 30% having active dosage of 1290 ppm, the 98.33% efficiency could be achieved.

On the contrary, when present composition comprising 95% of glyoxal and just 5% of PPG400 was used as scavenging composition, surprisingly and unexpectedly, the 98.33% efficiency was achieved just by using only 790 ppm active dosage of glyoxal (from 2500 ppm of the present composition) as against 1290 ppm of glyoxal without PPG400.

Therefore, the above experimental data in Table-I confirms that PPG400 has a surprising and unexpected synergistic effect on the $H_2S$ scavenging efficiency of glyoxal, which is substantially increased, and thereby, results in substantial reduction in required amount of glyoxal 30% from 1290 ppm to 790 ppm, which means saving of about 38.75% of glyoxal, and hence, the method employing present composition becomes more economical, industrially feasible and convenient.

Example 3

The $H_2S$ was purged in 100 ml of kerosene till concentration of $H_2S$ vapor reaches to 150% Vol in blank sample [Blank-II]. To the resulted solution 75 ppm of glyoxal 30% resulting in effective dosage of 22.5 ppm of glyoxal was added, and the solution was shaken well and kept at the room temperature. The concentration of $H_2S$ was measured, as in Example 1 after 20 hrs in vapour phase which was found to be 75% vol confirming 50% efficiency of glyoxal to scavenge hydrogen sulfide.

Example 4

To the blank sample of Example 3 [Blank-II], the 75 ppm of additive composition of Example 2 having effective dosage of 23.75 ppm of glyoxal and 1.25 ppm of PPG400 was added and treated in same manner as in Example 1. The concentration of $H_2S$ was measured as in Example 1 after 20 hrs in vapour phase which was found to be 40%Vol confirming 73.3% efficiency of additive composition to scavenge hydrogen sulfide.

Example 5

To the blank sample of Example 3 [Blank-II], 100 ppm of glyoxal 30% resulting in effective dosage of 30 ppm of glyoxal was added and treated in same manner as in Example 1. The concentration of $H_2S$ was measured as in Example 1 after 20 hrs in vapour phase which was found to be 60% vol confirming 60% efficiency of glyoxal to scavenge hydrogen sulfide.

Example 6

To the blank sample of Example 3, the 90 ppm of additive composition of Example 2 having effective dosage of 28.5 ppm of glyoxal and 1.5 ppm of PPG400 was added and treated in same manner as in Example 1. The concentration of $H_2S$ was again measured as in Example 1 after 20 hrs in vapour phase which was found to be 25% Vol confirming 83.3% efficiency of additive composition to scavenge hydrogen sulfide.

Example 7

To the blank sample of Example 3, 135 ppm of glyoxal 30% resulting in effective dosage of 40 ppm of glyoxal was added and treated in same manner as in Example 1. The concentration of $H_2S$ was measured as in Example 1 after 20 hrs in vapour phase which was found to be 50% vol confirming 66.6% efficiency of glyoxal to scavenge hydrogen sulfide.

Example 8

To the blank sample of Example 3, the 120 ppm of additive composition of Example 2 having effective dosage of 38 ppm of glyoxal and 2 ppm of PPG400 was added and treated in same manner as in Example 1. The concentration of $H_2S$ was again measured as in Example 1 after 20 hrs in vapour phase which was found to be just 10% Vol confirming 93.3% efficiency of additive composition to scavenge hydrogen sulfide.

Example 9

To the blank sample of Example 3, 165 ppm of glyoxal 30% resulting in effective dosage of 50 ppm of glyoxal was added and treated in same manner as in Example 1. The concentration of $H_2S$ was measured as in Example 1 after 20 hrs in vapour phase which was found to be 40% vol confirming 73.3% efficiency of glyoxal to scavenge hydrogen sulfide.

Example 10

To the blank sample of Example 3, the 150 ppm of additive composition of Example 2 having effective dosage of 47.5 ppm of glyoxal and 2.5 ppm of PPG400 was added and treated in same manner as in Example 1. The concentration of $H_2S$ was again measured as in Example 1 after 20 hrs in vapour phase which was found to be just 5% Vol confirming 96.6% efficiency of additive composition to scavenge hydrogen sulfide.

The results of Examples 3 to 10 are presented in Table-II.

TABLE II

| | Additive/ Additive Composition | Active (%) | Dosage (ppm) | Active Dosage (ppm) | $H_2S$ Vapor (% Vol) | Efficiency (%) |
|---|---|---|---|---|---|---|
| Blank-II | Blank Sample | — | — | — | 150 | — |
| Ex. 3 | Glyoxal 30% | 30 | 75 | 22.5 | 75 | 50 |
| Ex. 4 | Glyoxal/ PPG400 (95/05) | 33.3 | 75 | 25 | 40 | 73.3 |
| Ex. 5 | Glyoxal 30% | 30 | 100 | 30 | 60 | 60 |
| Ex. 6 | Glyoxal/ PPG400 (95/05) | 33.3 | 90 | 30 | 25 | 83.3 |
| Ex. 7 | Glyoxal 30% | 30 | 135 | 40 | 50 | 66.6 |
| Ex. 8 | Glyoxal/ PPG400 (95/05) | 33.3 | 120 | 40 | 10 | 93.3 |
| Ex. 9 | Glyoxal 30% | 30 | 165 | 50 | 40 | 73.3 |
| Ex. 10 | Glyoxal/ PPG400 (95/05) | 33.3 | 150 | 50 | 5 | 96.6 |

The synergistic effect of PPG400 on the $H_2S$ scavenging efficiency of glyoxal is also clearly and sufficiently evident from the experimental data of Examples 3 to 10 carried out at room temperature.

It can be seen from Table-II that when present scavenging composition comprising 5% of PPG400 and 95% of glyoxal is used, then scavenging efficiency of 73.3% could be achieved just by about 25 ppm active dosage of the present additive composition [Example 4] as against 50 ppm active dosage of glyoxal [Example 9].

It is also observed that 30 ppm of active dosage of present composition, surprisingly and unexpectedly, gave substantially high scavenging efficiency of 83.3% [Example 6] against only 60% efficiency of glyoxal [Example 5].

It is also observed that 40 ppm of active dosage of present composition, surprisingly and unexpectedly, gave substantially high scavenging efficiency of 93.3% [Example 8] against only 66.6% efficiency of glyoxal [Example 7].

It is also observed that 50 ppm of active dosage of present composition, surprisingly and unexpectedly, gave substantially high scavenging efficiency of 96.6% [Example 10] against 73.3% efficiency of glyoxal [Example 9].

The foregoing examples confirm that just by employing about 5% by weight of the polymer compound in additive composition of present invention not only requirement of (overall) amount of glyoxal in the additive composition is reduced, but also the requirement of amount of present scavenging additive composition is reduced, and further the desired efficiency could be achieved at a faster rate.

Examples 11 to 18

In following examples, efficiency of present additive composition (Example 14) has been compared with glyoxal (Example 11), additive composition comprising glyoxal and PEG 200 taken in weight ratio of 90:10 (Example 12), additive composition comprising glyoxal and PEG 400 taken in weight ratio of 90:10 (Example 13), additive composition comprising glyoxal and PPG 4000 taken in weight ratio of 90:10 (Example 15), additive composition comprising glyoxal and Pluronic L81 taken in weight ratio of 90:10 (Example 16), additive composition comprising glyoxal and Pluronic L61 taken in weight ratio of 90:10 (Example 17), additive composition comprising glyoxal and LAE taken in weight ratio of 90:10 (Example 18). For each example, a Blank-III was created wherein $H_2S$ was purged into 100 ml of kerosene oil till concentration of $H_2S$ vapor reaches to 150% vol. To the resulted solution given amount of additive was added resulting in given effective dosage of the additive and the solution was shaken well for 1 min and kept at room temperature. The concentration of $H_2S$ was measured, as in previous Examples 1, but after 2 hrs in vapour phase which value has been given in Table III.

enging efficiency of glyoxal, but it is substantially low as compared to capability of PPG-400 to enhance hydrogen sulfide scavenging efficiency of glyoxal.

It is also observed that 100 ppm of active dosage of Pluronic L81 and Pluronic L61 (ethylene oxide propylene oxide block co-polymer from BASF) as well as Lauryl alcohol 9 mole Ethoxylated gave substantially low scavenging efficiencies of 26.6%, 33.3% and 33.3%, respectively [Example 16, Example 17 and Example 18].

The foregoing examples 11 to 18 also confirm that just by employing about 10% by weight of the polymer compound in additive composition of present invention not only requirement of (overall) amount of glyoxal in the additive composition is reduced, but also the requirement of amount

TABLE III

| | Additive/ Additive Composition | Active (%) | Dosage (ppm) | Active Dosage (ppm) | H2S Vapor (% Vol) | Efficiency (%) |
|---|---|---|---|---|---|---|
| Blank III | Blank | — | — | — | 150 | — |
| Ex. 11 | Glyoxal 30% | 30 | 300 | 90 | 125 | 16.6 |
| Ex. 12 | Glyoxal/PEG 200 (90/10) | 33.3 | 300 | 90+10 | 110 | 26.6 |
| Ex. 13 | Glyoxal/PEG 400 (90/10) | 33.3 | 300 | 90+10 | 100 | 33.3 |
| Ex. 14 | Glyoxal/PPG 400 (90/10) | 33.3 | 300 | 90+10 | 60 | 60 |
| Ex. 15 | Glyoxal (30%) PPG-4000 (3.33%) | 30 3.33 | 300 300 | 90+10 | 100 | 33.3 |
| Ex. 16 | Glyoxal (30%) Pluronic L81 (3.33%) | 30 3.33 | 300 300 | 90+10 | 110 | 26.6 |
| Ex. 17 | Glyoxal (30%) Pluronic L61 (3.33%) | 30 3.33 | 300 300 | 90+10 | 100 | 33.3 |
| Ex. 18 | LAE 90/10 (33.3%) | 33.3 | 300 | 100 | 100 | 33.3 |

The synergistic effect of PPG400 on the $H_2S$ scavenging efficiency of glyoxal is also clearly and sufficiently evident from the experimental data of Examples 11 to 18 carried out at room temperature. It can be seen from Table-III that when present scavenging composition comprising 10% of PPG400 and 90% of glyoxal is used, then scavenging efficiency of 60% could be achieved just by 100 ppm active dosage of the present additive composition [Example 14].

It is also observed that 100 ppm of active dosage of 10% of PEG400 and 90% of glyoxal, gave substantially low scavenging efficiency of 33.3% [Example 13].

It is also observed that 100 ppm of active dosage of 10% of PEG200 and 90% of glyoxal, gave substantially low scavenging efficiency of 26.6% [Example 12].

It is also observed that 100 ppm of active dosage of 90% of glyoxal and 10% of PPG 4000, gave substantially low scavenging efficiency of 33.3% [Example 15] against only 16% efficiency with 30% glyoxal alone [Example 11]. These experiments confirm that, surprisingly and unexpectedly, PPG having higher molecular weight of about 4000 daltons do have capability of enhancing the hydrogen sulfide scavof present scavenging additive composition is reduced, and further the desired efficiency could be achieved at a faster rate.

Examples 19 to 22

In following examples, efficiency of present additive composition (Example 20) has been compared with glyoxal (Example 19), additive composition comprising glyoxal and PPG 4000 (Example 21), and additive composition comprising glyoxal and Pluronic L61 (Example 22) when taken in the amount as given in Table IV. For each example, a Blank-IV was created wherein $H_2S$ was purged into 100 ml of kerosene oil till concentration of $H_2S$ vapor reaches to 175% vol. To the resulted solution given amount of additive was added resulting in given effective dosage of the additive and the solution was shaken well for 1 min and kept at room temperature. The concentration of $H_2S$ was measured, as in previous Examples 1, but after 1 hr in vapour phase which value has been given in Table IV.

TABLE IV

| | Additive/ Additive Composition | Active (%) | Dosage (ppm) | Active Dosage (ppm) | H2S Vapor (% Vol) | Efficiency (%) |
|---|---|---|---|---|---|---|
| Blank IV | Blank IV | — | — | — | 175 | — |
| Ex. 19 | Glyoxal 30% | 30 | 600 | 180 | 125 | 28.5 |
| Ex. 20 | Glyoxal/PPG 400 (95/05) | 33.3 | 600 | 190+10 | 50 | 71.4 |

TABLE IV-continued

| | Additive/<br>Additive Composition | Active<br>(%) | Dosage<br>(ppm) | Active<br>Dosage<br>(ppm) | H2S<br>Vapor<br>(% Vol) | Efficiency<br>(%) |
|---|---|---|---|---|---|---|
| Ex. 21 | Glyoxal (30%) | 30 | 600 | 180+ | 100 | 42.9 |
| | PPG-4000 (3.33%) | 3.33 | 600 | 20 | | |
| Ex. 22 | Glyoxal (30%) | 30 | 600 | 180+ | 100 | 42.9 |
| | Pluronic L61 (3.33%) | 3.33 | 600 | 20 | | |

The synergistic effect of PPG400 on the $H_2S$ scavenging efficiency of glyoxal is also clearly and sufficiently evident from the experimental data of Examples 19 to 22 carried out at room temperature. It can be seen from Table-IV that when present scavenging composition comprising 5% of PPG400 and 95% of glyoxal is used, then scavenging efficiency of 71.4% could be achieved just by 200 ppm active dosage of the present additive composition [Example 20].

It is also observed that 200 ppm of active dosage of 10% of PPG4000 and 90% of glyoxal, gave substantially low scavenging efficiency of 42.9% [Example 21] as against 28.5% efficiency of glyoxal [Example 19]. These experiments confirm that, surprisingly and unexpectedly, PPG having higher molecular weight of about 4000 daltons do have capability of enhancing the hydrogen sulfide scavenging efficiency of glyoxal, but it is substantially low as compared to capability of PPG-400 to enhance hydrogen sulfide scavenging efficiency of glyoxal.

It is also observed that 200 ppm of active dosage of 10% of Pluronic L61 and 90% of glyoxal, gave substantially low scavenging efficiency of 42.9% [Example 22].

Therefore, the foregoing experiments confirm that glyoxal is capable of scavenging $H_2S$. However, when present composition comprising glyoxal and about 5% to 10% of polymer made from propylene oxide (PPG400) is used, the $H_2S$ scavenging efficiency of glyoxal is, surprisingly and unexpectedly, substantially increased confirming synergistic effect of scavenging additive composition of present invention.

It can also be observed from foregoing experiments that small amount of PPG400 in present composition results in substantial reduction in required amount of glyoxal 30% to achieve desired efficiency, which means saving of substantial amount of glyoxal, and hence, the method employing present composition becomes more economical, industrially feasible and convenient.

From the foregoing examples it is also clearly evident that with present hydrogen sulfide scavenging additive composition and method of scavenging hydrogen sulfide in hydrocarbons, one can now achieve hydrogen sulfide scavenging without facing a) problem of fouling, and hence without requiring additional anti-fouling additive, and b) problem of decomposition of products in acidic pH, and hence, hydrogen sulfide is substantially scavenged in one attempt only.

Further, no elimination of hydrogen sulfide odor was observed in any of the above-described experiments which confirm that hydrogen sulfide has been scavenged to maximum possible level and the concentration of hydrogen sulfide, if any in the hydrocarbon is negligible.

The invention claimed is:

1. An additive composition for scavenging hydrogen sulfide in hydrocarbons or hydrocarbon streams, wherein said additive composition consists of (a) glyoxal and (b) a polymer compound, wherein said polymer compound is polypropylene glycol having about 200 to about 800 dalton molecular weight.

2. The additive composition as claimed in claim 1, wherein the glyoxal and the polymer compound are present in an amount varying between 99 parts of glyoxal to 0.1 part of polymer compound or 0.1 part of glyoxal to 99 parts of polymer compound.

3. The additive composition as claimed in claim 1, wherein the polymer compound is present in an amount varying up to about 25% by weight of the composition.

4. The additive composition as claimed in claim 1, wherein said polypropylene glycol has a molecular weight varying from about 200 to about 600 dalton.

5. The additive composition as claimed in claim 1, wherein the polymer compound is present in an amount varying up to about 10% by weight of the composition.

6. The additive composition as claimed in claim 1, wherein said polypropylene glycol has molecular weight of about 400 dalton.

7. A method of using an additive composition consisting of glyoxal and a polymer compound, wherein said polymer compound is polypropylene glycal having about 200 to about 800 dalton molecular weight for scavenging hydrogen sulfide in hydrocarbons or a hydrocarbon stream, wherein the additive composition is added to the hydrocarbons or the hydrocarbon stream for scavenging or removing hydrogen sulfide from the hydrocarbons or the hydrocarbon stream.

8. The method as claimed in claim 7, wherein glyoxal and polymer compound are present in an amount varying between 99 parts of glyoxal to 0.1 part of polymer compound and 0.1 part of glyoxal to 99 parts of polymer compound.

9. The method as claimed in claim 7, wherein the polymer compound is present in an amount varying up to about 25% by weight of the composition.

10. The method as claimed in claim 7, wherein said polypropylene glycol has a molecular weight varying from about 200 to about 600 dalton.

11. The method as claimed in claim 7, wherein said hydrocarbon stream comprises crude oil, fuel oil, sour gas, asphalts or refined products contained in storage tanks, vessels, or pipelines.

12. The method as claimed in claim 7, wherein the polymer compound is present in an amount varying up to about 10% by weight of the composition.

13. The method as claimed in claim 7, wherein said polypropylene glycol has molecular weight of about 400 dalton.

14. A method for scavenging sulfur containing compounds including hydrogen sulfide from hydrocarbons or a hydrocarbon stream, comprising treating the hydrocarbons or the hydrocarbon stream with an additive composition which scavenges or removes sulfur containing compounds including hydrogen sulfide from the hydrocarbons or the hydrocarbon stream, and wherein said additive composition consists of glyoxal and polymer compound, wherein said polymer compound is polypropylene glycol having about 200 to about 800 dalton molecular weight.

15. The method as claimed in claim 14, wherein glyoxal and polymer compound are present in an amount varying between 99 parts of glyoxal to 0.1 part of polymer compound and 0.1 part of glyoxal to 99 parts of polymer compound.

16. The method as claimed in claim 14, wherein the polymer compound is present in an amount varying up to about 25% by weight of the composition.

17. The method as claimed in claim 14, wherein said polypropylene glycol has a molecular weight varying from about 200 to about 600 dalton.

18. The method as claimed in claim 14, wherein said hydrocarbon stream comprises crude oil, fuel oil, sour gas, asphalts or refined products contained in storage tanks, vessels, or pipelines.

19. The method as claimed in claim 18, wherein the composition is added to the crude oil when it is passing through a desalter or is being treated with wash water in a crude oil processing system.

20. The method as claimed in claim 14, wherein the composition is added in an amount varying from about 1 to about 4000 ppm by weight of the hydrocarbon or the hydrocarbon stream.

21. The method as claimed in claim 14, wherein the composition is injected in flow lines during development stage of a field.

22. The method as claimed in claim 14, wherein gaseous hydrocarbon or gaseous hydrocarbon stream gas containing hydrogen sulfide is passed through an absorption tower wherein the composition has been injected in production facilities.

23. The method as claimed in claim 14, wherein the polymer compound is present in an amount varying up to about 10% by weight of the composition.

24. The method as claimed in claim 14, wherein said polypropylene glycol has molecular weight of about 400 dalton.

* * * * *